United States Patent [19]
Erlichman

[11] 3,754,457
[45] Aug. 28, 1973

[54] PHOTOGRAPHIC CASSETTE
[75] Inventor: Irving Erlichman, Wayland, Mass.
[73] Assignee: Polaroid Corporation, Cambridge, Mass.
[22] Filed: July 27, 1972
[21] Appl. No.: 275,536

[52] U.S. Cl............................ 95/19, 95/13, 96/76 C, 250/68
[51] Int. Cl. ........................................... G03b 19/10
[58] Field of Search........................... 95/19, 23, 13; 250/68; 96/76 C; 221/232

[56] References Cited
UNITED STATES PATENTS
3,607,283  9/1971  Gold .................................. 96/76 C
3,541,940  11/1970  Bartnick et al. .................... 95/13 X
3,672,274  6/1972  Ewald et al. ........................ 95/19 X
3,443,500  5/1969  Norton et al. ........................... 95/19

Primary Examiner—Richard L. Moses
Attorney—Robert L. Berger, Robert F. Peck et al.

[57] ABSTRACT

A film cassette having a plurality of walls including a forward wall and an end wall which cooperate with each other to define an opening through which a film unit is adapted to be advanced, leading end first, to the exterior of the cassette. Each of the film units includes near a leading end thereof a laterally extending reservoir of processing liquid which is adapted to be ruptured and the contents thereof spread in contact with a photosensitive element of the film unit to initiate formation of a visible image in the film unit. The slot has a configuration similar to that of the film unit and reservoir, as viewed leading end first, in order to prevent the movement of more than one film unit at a time from the cassette.

14 Claims, 3 Drawing Figures

Patented Aug. 28, 1973 3,754,457
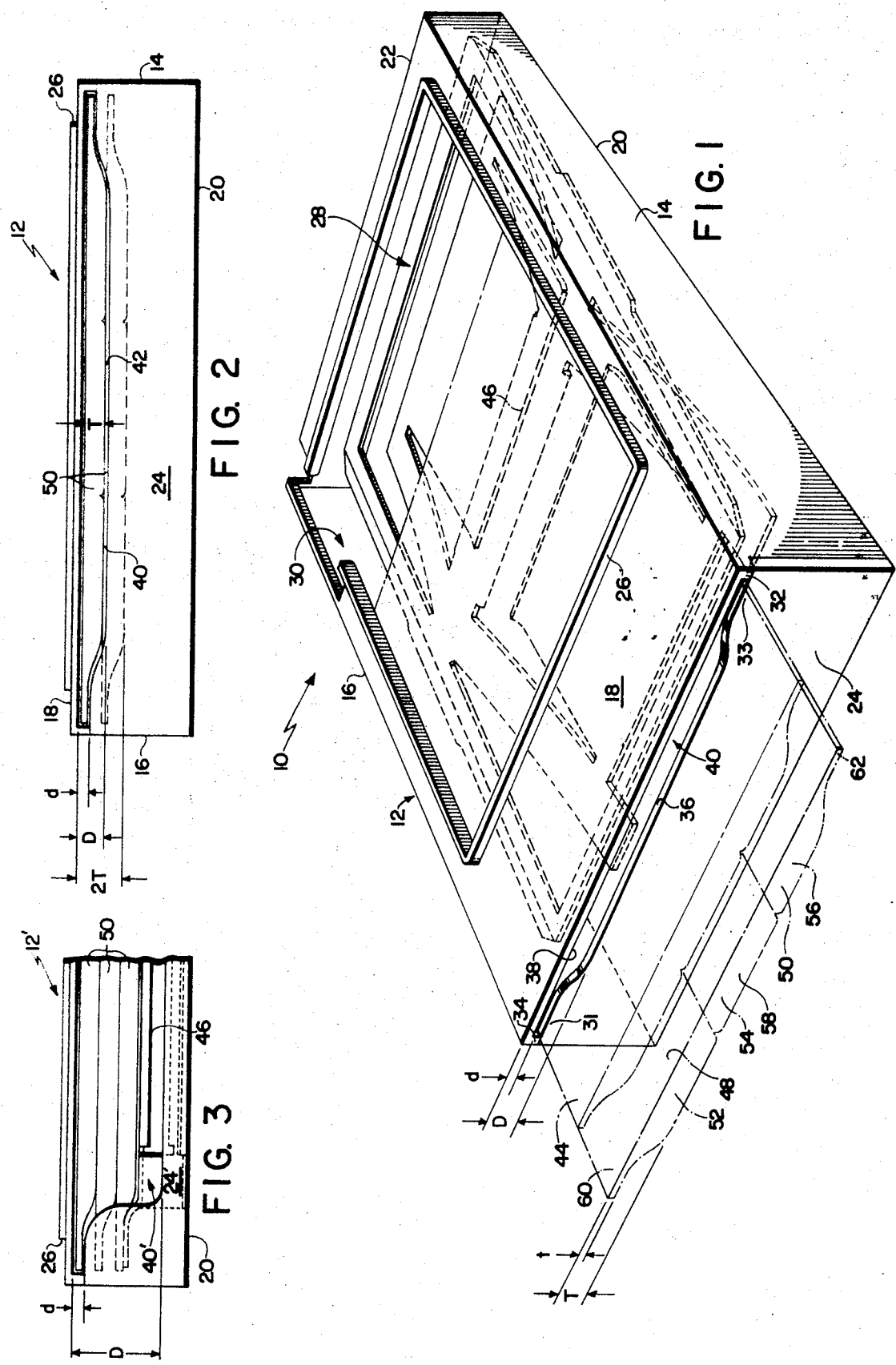

PHOTOGRAPHIC CASSETTE

BACKGROUND OF THE INVENTION

1. Field of the Invention

This invention relates to photographic film cassettes.

2. Description of the Prior Art

The present invention is concerned with improvements in photographic film cassettes which are adapted to house a plurality of film units, each of which includes a container or reservoir of processing liquid mounted near a leading end thereof. The film units are located within the cassette in stacked relation with their leading ends, i.e., the end containing the reservoir, positioned adjacent an end wall of the cassette. Generally, the cassette is provided with a platen for resiliently biasing the stack of film units toward one of the walls of the cassette such that an end film unit in the stack will be located in alignment with an exit slot in the end wall. It has been found that frictional forces generated between the end film unit located in alignment with the exit slot and the next succeeding film unit in the stack during movement of the end film unit out of the cassette via the exit slot may be sufficient to move the next succeeding film unit at least partially through the slot. The premature movement of the second or succeeding film unit is not desirable because it may be moved out of its exposure position within the cassette prior to exposure; or, in the case where the film unit is to be exposed after it has been moved out of the cassette, the premature movement could result in misregistration between the film advancing apparatus of the camera and the second film unit. This problem has been solved in part by providing the end wall of the cassette with a thin resilient member which extends part way across the slot. As shown in U.S. Pat. No. 3,607,283, the resilient member is effective to prevent the movement of more than one film unit at a time through the exit slot in the end wall of the cassette. However, although U.S. Pat. No. 3,607,283 provides one solution for the aforementioned problem, the thinness and resiliency of the member lends itself to either being broken or permanently deformed, thereby destroying its intended function.

Another problem which may arise with film assemblages of the type described is leakage of actinic light into the cassette via the exit slot thereby resulting in possible fogging of one or more film units within the cassette. This problem is partially obviated by providing the film assemblage with an opaque dark slide having appropriate means thereon which prevents the entry of actinic light into the cassette via the exit slot. However, after the film assemblage has been inserted into the camera and the dark slide removed, the problem arises again because ambient light within the camera may now enter the cassette via the exit slot and possibly fog the film units.

SUMMARY OF THE INVENTION

The instant invention relates to photographic film cassettes and, more particularly, to a cassette adapted to receive film units of the type having a laterally extending leading edge of non-uniform thickness, e.g., film units of the type shown in U.S. Pat. No. 3,415,644 wherein a pod or reservoir of processing liquid is attached to a leading end of each film unit. The film cassette includes a plurality of walls including a pair of longitudinally extending side walls, first and second laterally extending end walls, a rear wall, and a forward wall. It should be noted that the terms "forward" and "rear" as used herein are merely terms of convenience and are not to be construed as limiting the scope of the instant invention. The forward wall preferably includes a light-transmitting section, e.g., an aperture, through which the forwardmost film unit in a stack is adapted to be exposed, and a slot, which extends to the rear of the forward wall and part way down the first end wall, through which suitable film-advancing apparatus is adapted to extend into engagement with the forwardmost film unit prior to moving the latter out of the cassette. The second end wall cooperates with the forward wall to define a transversely extending slot of non-uniform depth through which the forwardmost film unit in the stack is adapted to be moved by the film-advancing apparatus. A platen is positioned within the cassette between the lowermost film unit in the stack and the rear wall for urging the forwardmost film unit into a position in engagement with the interior surface of the forward wall and with its leading end located in alignment with the transversely extending slot. Alternatively, if the film unit is to be moved out of the cassette prior to being exposed, the forward wall of the cassette would not have an exposure aperture therein. In a preferred embodiment of the invention, the configuration of the laterally extending slot is substantially identical to that of the leading end of the film unit located in alignment with the slot, as viewed through the slot, whereby movement of more than one film unit at a time through the slot is prevented, and the passage of ambient light therethrough is substantially prevented. In an alternative embodiment, the transversely extending slot has a configuration similar, but not identical to that of the leading edge of the forwardmost film unit located in alignment with the slot, viewed as described above. In the latter embodiment, only the ends of the slot are configured to prevent the movement of more than one film unit at a time through the transversely extending slot.

An object of the invention is to provide a photographic film cassette with a transversely extending slot having a configuration of non-uniform depth for preventing the movement of more than one film unit at a time through the slot.

Another object of the invention is to provide a photographic film assemblage with a film cassette having a laterally extending slot of non-uniform depth whose configuration is substantially identical to that of an end of a film unit located in alignment with the slot.

Another object of the invention is to provide a photographic film cassette with a film withdrawal slot which will cooperate with the leading end of the film unit located in alignment with the slot to prevent the passage of actinic light through the slot and the movement of more than one film unit at a time through the slot.

Other objects of this invention will in part be obvious and will in part appear hereinafter.

The invention accordingly comprises the product possessing the features, properties and the relation of components which are exemplified in the following detailed disclosure, and the scope of the application of which will be indicated in the claims.

BRIEF DESCRIPTION OF THE DRAWING

For a fuller understanding of the nature and objects of the invention, reference should be had to the follow- FIG. 1 is a perspective view of the film cassette of the instant invention with a film unit shown partially withdrawn from the cassette;

FIG. 2 is an elevational view of the cassette shown in FIG. 1; and

FIG. 3 is an elevational view similar to FIG. 2, showing a section of an alternative embodiment of the invention.

DETAILED DESCRIPTION OF THE INVENTION

Reference is now made to FIG. 1 of the drawing wherein is illustrated a photographic film assemblage denoted generally by reference numeral 10. Film assemblage 10 includes a film cassette 12 having a pair of laterally spaced, longitudinally extending, tapered side walls 14 and 16, front and rear walls 18 and 20 extending between side walls 14 and 16, and first and second end walls 22 and 24, respectively. Front wall 18 includes an integral rib 26 which partially defines the periphery of an exposure aperture 28, and an opening 30 through which film advancing apparatus is adapted to extend into engagement with the foremost film unit in the stack. Extending from wall 18 are a pair of flanges 32 and 34 which are adapted to engage rigid integral extensions 31 and 33 of the top edge 36 of wall 24 to space the extensions from the interior surface 38 of front wall 18 thereby defining the minimum depth "d" of a laterally extending slot 40 through which a film unit is adapted to be moved leading end first. The top edge 36 of leading end wall 24 cooperates with interior surface 38 to provide the slot 40 with an irregular configuration having an intermediate depth "D" and terminal ends of a depth "d" which is less than "D."

The cassette 12 is adapted to contain a stack of film units 44 (only the foremost film unit being shown schematically in FIG. 1) and a platen 46. Platen 46 is positioned between the lowermost film unit 44 in the stack and the rear wall 20, and is adapted to resiliently urge the stack of film units toward the front wall 18 such that the foremost film unit 44 in the stack is located with its leading end 48 located in alignment with slot 40 and its photosensitive area positioned adjacent to and in alignment with exposure aperture 28.

Each film unit 44 includes, at its leading end 48, a laterally extending reservoir 50 containing a supply of processing liquid which is adapted to be spread across an exposed photosensitive element of the film unit to initiate development of a visible image, as is well known in the art.

Reservoir 50 may be comprised of a plurality of sections 52, 54 and 56 as shown in FIGS. 1 and 2 or, alternatively, may be a single section as schematically represented in FIG. 3. Each reservoir 50 is tapered at its opposite ends such that the leading end portion of each film unit has an intermediate portion 58 of thickness "T" and terminal end portions 60 and 62 of a thickness "t" which is less than "T" and no greater than "d".

From the foregoing, it can be seen that when the foremost film unit 44, shown in phantom in FIG. 1, is located wholly within cassette 12 with its leading end located in alignment with the slot 40, the passage of light therethrough is substantially reduced due to the substantially identical cross-sectional configurations of the transversely extending reservoir 50 and the transversely extending slot 40. Also, as is readily apparent from FIGS. 1 and 2, the substantially identical cross-sections of the slot and reservoir prevent the movement of more than one film unit at a time through the slot. Further, it should be noted that the rigid ends 36 of slot 40 function to prevent the movement of more than one film unit at a time through the slot as long as depth "d" is less than 2"T" and greater than "t", as best shown in FIG. 2.

While slot 40 has been described and shown so far as having identical terminal ends of a depth "d," it is within the scope of the invention to increase the depth of one of the ends. However, if the slot is so configured, it is important that the opening 30 for the aforementioned film advancing apparatus be located near the cassette side wall closest to the end of the slot having the depth "d." Should the opening be located near the cassette side wall most remote from the reduced end of the slot, movement of the foremost film unit in the stack may cause the next succeeding film unit in the stack to pivot slightly about a point near the reduced end of the slot thereby possibly resulting in a portion of the succeeding film unit protruding through the end of the slot having the greatest depth.

Reference is now made to FIG. 3 wherein is shown a film cassette 12' having an exit slot 40' in its leading end wall 24'. Slot 40' has a configuration which is similar but not substantially identical to that of the leading end of film unit 44. Slot 40' differs from slot 40 in that it does not cooperate with the leading end of a film unit to substantially reduce the passage of light into the cassette 12' via slot 40'; but, does represent a savings in the total amount of material used to form the cassette.

Since certain changes may be made in the above product without departing from the scope of the invention herein involved, it is intended that all matter contained in the above description or shown in the accompanying drawing shall be interpreted as illustrative and not in a limiting sense.

What is claimed is:

1. A cassette for receiving a plurality of photographic film units of the type including a laterally extending leading end portion having an intermediate portion of thickness "T" and terminal end portions of a thickness "t" less than "T", said cassette comprising:
   a pair of side walls;
   front and rear walls extending between said side walls;
   a first end wall extending between first ends of said side walls and said front and rear walls;
   a second end wall extending between second ends of said side walls and said rear wall, said second end wall including means cooperating with a second end of said forward wall to define a laterally extending slot through which a photographic film unit is adapted to be moved, leading end first, said slot having an intermediate depth "D" at least equal to "T" and at least one terminal end having a depth "d" at least equal to "t" and less than 2"T" whereby movement of more than one photographic film unit at a time through said slot is prevented.

2. A cassette as defined in claim 1 wherein said slot includes two terminal ends each of which has a depth "d" less than 2"T."

3. A cassette as defined in claim 1 wherein said front wall includes aperture means located adjacent one of said side walls for receiving means for moving a film unit through said slot, and said at least one terminal end of said slot is located adjacent said one side wall.

4. A cassette as defined in claim 3 wherein said at least one terminal end of said slot is defined in part by an integral extension of said second end wall.

5. A cassette as defined in claim 4 wherein said integral extension is substantially rigid.

6. A cassette as defined in claim 3 wherein the configuration of said slot is substantially identical to the configuration of the leading end of a film unit.

7. A photographic film assemblage comprising:
an open-end container including spaced front and rear walls interconnected by a pair of side walls and an end wall;
a plurality of substantially flat film units located in stacked relation in said chamber, each of said film units including near a leading edge thereof a laterally extending reservoir containing a processing liquid adapted to be spread in contact with said film unit to initiate the development of a visible image, said laterally extending reservoir including an intermediate portion of thickness "T" and terminal end portions of a smaller thickness "t"; and
a second end wall attached to said side walls and said rear wall, said second end wall including means cooperating with said forward wall to define a laterally extending slot dimensioned to permit the passage of a film unit therethrough, said slot having a minimum depth "D" at least equal to "T" intermediate its ends and at least one terminal end having a minimum depth "d" at least equal to "t" and less than 2"T" whereby movement of more than one film unit at a time through said slot is prevented.

8. A photographic film assemblage as defined in claim 7 wherein said slot includes two terminal ends each of which has a depth "d" less than 2"T."

9. A photographic film assemblage as defined in claim 7 wherein said front wall includes aperture means located adjacent one of said side walls for receiving means for moving a film unit through said slot, and said at least one terminal end of said slot is located adjacent said one side wall.

10. A photographic film assemblage as defined in claim 9 wherein said at least one terminal end of said slot is defined in part by an integral extension of said second end wall.

11. A photographic film assemblage as defined in claim 10 wherein said integral extension is substantially rigid.

12. A photographic film assemblage as defined in claim 9 wherein the configuration of said slot is substantially identical to that of said film unit including said laterally extending reservoir as viewed through said slot.

13. A photographic film assemblage as defined in claim 12 further including means for sequentially biasing said film units into a position wherein said laterally extending reservoir is located in alignment with said slot.

14. A photographic film assemblage as defined in claim 13 wherein said alignment between said laterally extending reservoir and said slot is effective to substantially reduce the passage of ambient light through said slot.

* * * * *